July 21, 1925.

T. F. BAILY

ELECTRIC SOAKING PIT

Original Filed March 18, 1924

1,546,535

Inventor

Thaddeus F. Baily

By Frease and Bond

Attorneys

Patented July 21, 1925.

1,546,535

UNITED STATES PATENT OFFICE.

THADDEUS F. BAILY, OF ALLIANCE, OHIO.

ELECTRIC SOAKING PIT.

Continuation of application Serial No. 700,003, filed March 18, 1924. This application filed December 17, 1924. Serial No. 756,450.

*To all whom it may concern:*

Be it known that I, THADDEUS F. BAILY, a citizen of the United States, residing at Alliance, in the county of Stark and State of Ohio, have invented certain new and useful Improvements in Electric Soaking Pits, of which the following is a specification.

This invention relates to electrically heated soaking pits and the like, and is a continuation of the common subject matter of my copending application Serial No. 700,003, filed March 18, 1924.

The objects of the invention are to provide a gas tight soaking pit heated by an electric resistor trough exposed to the atmosphere of the heating chamber, an arched baffle wall being provided in the heating chamber, spaced from the main side wall of the pit and from the top and bottom thereof, the resistor trough being supported at opposite sides upon said baffle wall and the main side wall of the pit.

The above and other objects may be attained by constructing the pit in the manner illustrated in the accompanying drawing, in which—

Figure 1:
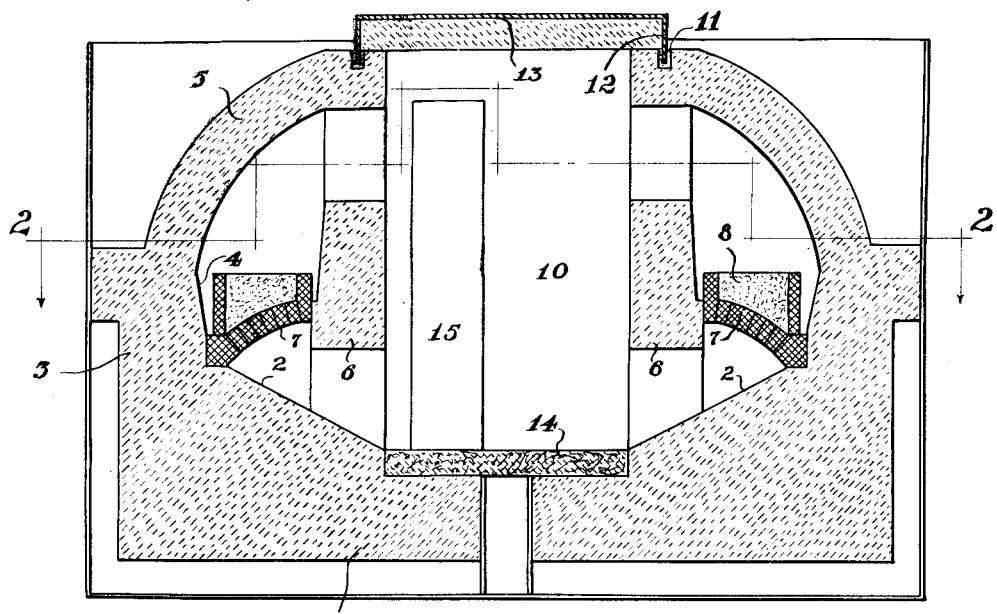
Figure 2:
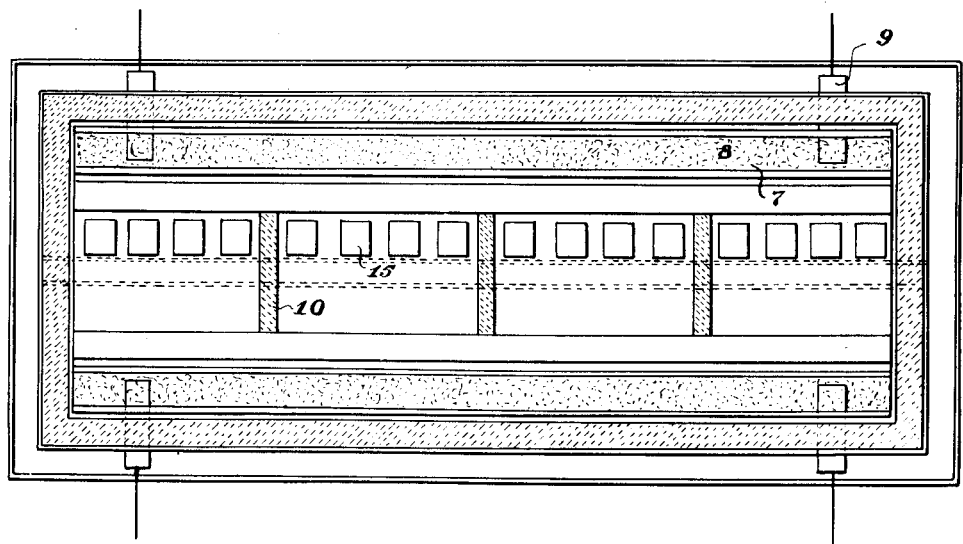

Figure 1 is a transverse sectional view through a soaking pit embodying the invention; and Fig. 2, a plan sectional view of the pit, upon a smaller scale.

Similar numerals refer to similar parts throughout the drawing.

The pit is built of suitable refractory material, built below the level of the floor, and comprises the bottom 1, preferably having the inclined portions 2, along each side, and the side walls 3, which may be inclined for a portion of their height as shown at 4 and then arched as at 5.

An arched baffle wall 6 is provided along each side of the pit, spaced from the adjacent main side wall and from the top and bottom of the pit. The resistor troughs 7 are provided along the sides of the pit, for heating the same.

Each trough is formed of carbon silicide or other suitable highly refractory material, preferably arched transversely as shown in Fig. 1, and supported at opposite sides upon the adjacent main side wall and baffle wall.

The trough thus assists in supporting the baffle wall and as each baffle wall is provided with a beveled face disposed away from the trough, it will be seen that a relieving space is provided upon each side of each trough, and flared from the bottom toward the top thereof.

The only point of contact between the trough and the walls is at the bottom of the trough, thus providing for radiation of the heat from all sides of the trough and preventing damage to the portions of the side and baffle walls which are adjacent thereto.

Each trough is filled with a granular, carbonaceous material indicated at 8, electrodes 9 extending into opposite ends of the trough, whereby the current passing through the carbonaceous material, between the electrodes, heats the trough to the desired temperature.

The pit is divided into a plurality of holes by the partition walls 10, formed of suitable refractory material and extending from top to bottom of the pit, between the baffle walls 6.

A sand trough 11, may be provided around the upper edge of each hole to receive the depending flange 12 formed around the edge of each cover 13.

Coke breeze or other granular carbon shown at 14 is placed in the bottom of the pit to provide a non-oxidizing atmosphere and to support the ingots.

In charging the soaking pit the cover is removed from the hole to be charged and the ingots shown at 15, are charged through the open top of the hole and placed, in upright position as illustrated, upon the coke breeze covering the bottom of the hole.

After the hole is charged the cover is placed thereon, the sand seal providing a gas tight hole in which the ingots are soaked, and the baffle walls prevent the ingots from coming into contact with the resistor troughs while at the same time permitting complete radiation from the troughs in all directions.

I claim:—

1. An electric soaking pit including a baffle wall extending across the side of the working chamber and spaced from the roof and bottom and main side wall of the pit, and a resistor trough supported at opposite sides upon the main side wall and baffle wall.

2. An electric soaking pit including a baffle wall extending across the side of the working chamber and spaced from the roof and bottom and main side wall of the pit, and a transversely arched resistor trough supported at opposite sides upon the main side wall and baffle wall.

3. An electric soaking pit including an arched baffle wall extending across the side of the working chamber and spaced from the roof and bottom and main side wall of the pit, and a resistor trough supported at opposite sides upon the main side wall and baffle wall.

4. An electric soaking pit including a baffle wall extending across the side of the working chamber and spaced from the roof and bottom and main side wall of the pit, and a resistor trough supported at opposite sides upon the main side wall and baffle wall and contacting therewith only at its bottom portion.

5. An electric soaking pit including a baffle wall extending across the side of the working chamber and spaced from the roof and bottom and main side wall of the pit, and a resistor trough supported at opposite sides upon the main side wall and baffle wall, the upper portion of said trough being spaced from said side and baffle walls.

6. An electric soaking pit including a baffle wall extending across the side of the working chamber and spaced from the roof and bottom and main side wall of the pit, and a resistor trough supported at opposite sides upon the main side wall and baffle wall, said side and baffle walls being inclined away from the trough from the bottom toward the top thereof.

7. An electric soaking pit including a baffle wall extending across each side of the working chamber and spaced from the roof and bottom and main side walls of the pit, a resistor trough supported at opposite sides upon each main side wall and baffle wall, and transverse partition walls located between the baffle walls.

8. A closed type, gas tight furnace chamber including carbonaceous electric resistance units exposed to the atmosphere of the heating chamber, and a loose carbonaceous material upon the bottom of the heating chamber to support ingots to be heated and to provide a reducing atmosphere to prevent oxidization of the carbonaceous material of the electric resistance unit.

9. An electrically heated soaking pit including a baffle wall extending along one side of the pit, spaced from the main side wall of the pit and from the top and bottom of the pit and forming one side of the working chamber, an arched bottom resistor trough extending lengthwise of the pit and parallel to the baffle wall, one end of the arch resting upon the main side wall and the other against the baffle wall.

10. A soaking pit of the character described including a baffle wall extending across the end of the working chamber and spaced from the roof and bottom and main side wall of the pit and a resistor trough supported at opposite sides upon the main side wall of the pit and the baffle wall.

11. A soaking pit of the character described including a baffle wall extending across the end of the working chamber and spaced from the roof and bottom and main side wall of the pit and an arched resistor trough supported at opposite sides upon the main side wall of the pit and the baffle wall.

12. A soaking pit of the character described including a baffle wall extending across the end of the working chamber and spaced from the roof and bottom and main side wall of the pit and a resistor trough supported at opposite sides upon the main side wall of the pit and the baffle wall, that part of the baffle wall and main side wall adjacent to the vertical walls of the trough being spaced from the upper portions of said trough walls to provide relieving spaces for the heat from said trough walls.

In testimony that I claim the above, I have hereunto subscribed my name.

THADDEUS F. BAILY.